No Printed Specification Available
6422X
J. Woolley.
Edging Sheet-Metal.
Patented Mar. 16, 1831.
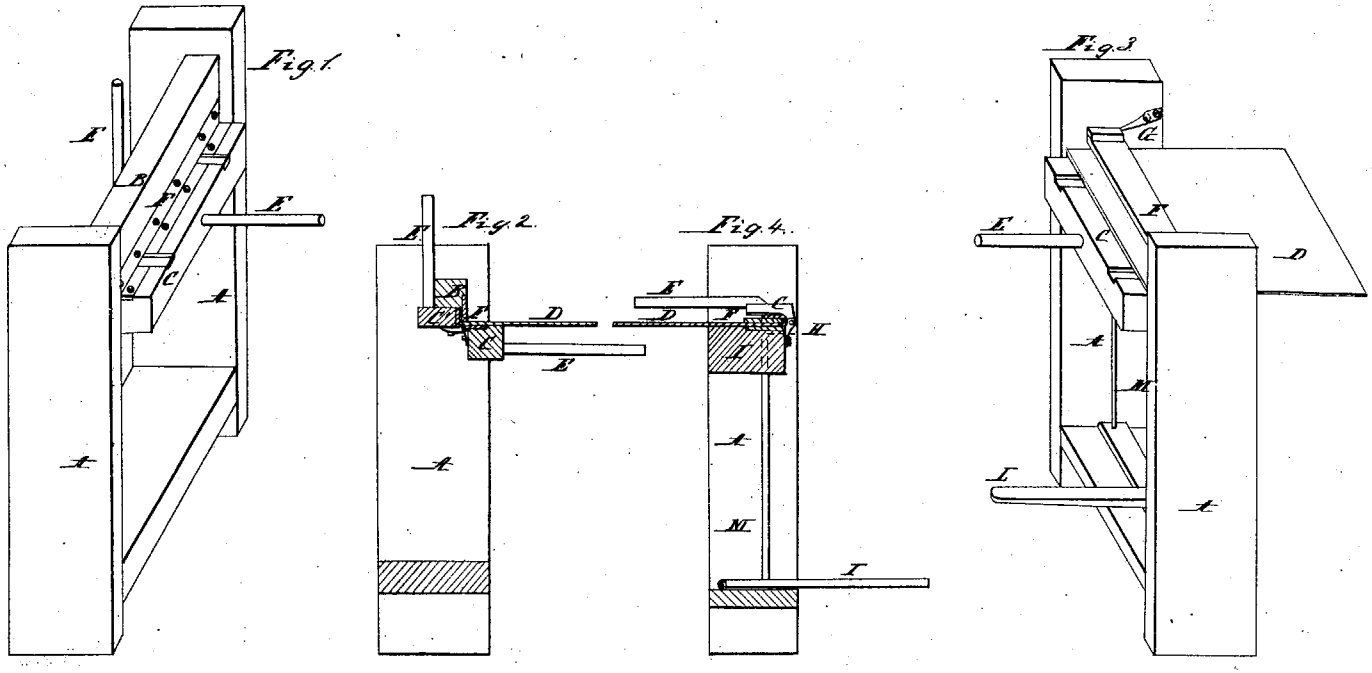
N. PETERS, PHOTO-LITHOGRAPHER, WASHINGTON, D. C.

6422X Mar 16 1831

John Woolley of New York City.

Letters Patent.

The Schedule referred to in these Letters Patent and making part of the same
containing a description in the words of the said John Woolley himself of
his improvement in the Edging machine, or "French Horse" for turn-
ing the edges of tin copper or Sheet Iron To all to whom these presents shall come. Be it known that I
John Woolley of the City County and State of New York. have dis
covered a new and valuable improvement in the edgeing machine
or "French Horse" and that the following is a full and exact des-
cription of the construction and operation of said improvement as
invented by me. This invention is an improvement on the
old edging machine or "French Horse" now in use for turning the
the edges of tin. copper or sheet. iron. for the roofing of Houses &c.
The construction is as follows. There is a suitable frame made
of wood or other proper substance, and of tapering form towards
the top. There is a horizontal bar secured to the uprights of this
frame. and passing across the top of it. At the sides of this
bar are two others which are placed parallel with and below it
and are moveable by means of gudgeons on their ends within the
uprights of the frame. Secured on the bars are blades of steel or
other proper substance. one of which is placed on the upper surface
of each of the moveable bars. while the other is firmly fastened to
the outer side of the permanent bar in a vertical position and projects
below the surface of said bar. This blade is called the former. as
the metal is bent over it by the action of the others. The tin or
other substance is bent or turned in sheets. and is inserted under
the former at back of the frame. the blade on the front bar being
depressed to admit the edge between it and the former. when
it is raised by means of a handle or lever inserted in the front
bar. and thus turns up the edge of the tin at right angles
The operation is completed by turning up the opposite bar on Drawing 6422x Mar 16, 1831 on which the sheet rests to a perpendicular position thus bending the
edge over the Former The sheet is then drawn out endwise; In
order to bend the edges of a sheet of tin. it is first necessary that the
corners. be cut off. that the bend of one side may not interfere with
the other. In this case when bent or turned by the old method. the
extremities at each side are flattened on account of the ends of the
blade or Former being square or circled longer above the edge. It is
then necessary to open them by hand. The subscriber effectually re:
moves. this evil by performing the whole work of edging at one opera
tion. This is effected by a small point or projection from each end
of the Former. which penetrating into the extremity of the bend where
the end of the sheet has been cut off. preserves it equal throughout
On the upper surface of the moveable bar at the back of the Former
are two grooves cut into it directly across. these are for receiving
and preserving entire the edges of the sheet already turned while
the other sides are acted upon by the former. The preceding
was invented before the 13[th] January 1831. The subscriber claims
the privilege of varying or simplifying the construction of his im
proved. Edging machine. so that a sheet of any length or any num-
ber of sheets may be turned at the same operation. In this case
the Former should be made as before mentioned and is to be firm-
ly secured or otherwise fastened to a spring which is screwed to a
suitable bed or frame in such a manner that the former may rest
flat upon it when pressed down; the spring on the back part serv-
ing to elevate it sufficiently for the insertion of the sheet. There
is a corresponding blade which serves as a rest for the Former & is
secured by means of screws or otherwise fastened to the front of the bed
or frame, and comes in contact with the Former at right angles.
There is hinged to the front of the frame & level with its surface
a board of any length required, which has on its surface a correspondin
blade. This board serves as a rest for the sheet when under the For-
mer. There is a treadle attached by suitable contrivance to the
under part of the former which is used to hold the sheet in its place and prevent its slipping and is acted upon by the foot. (A lever to be worked by hand may be substituted when the work is light) The sheet of tin is inserted under the former which is then brought down upon it by means of the treadle the board is then to be turned completely over. (Similar to the shutting of a Book) carrying the sheet with it and thus turning or bending the edge to the required form. on the surface of this board should be grooves to admit the bent sides of the tin as before mentioned, it may also be used as a Gauge Board. The subscriber claims the sole privilege of constructing his improved Edging Machine of Cast iron. Wood or any other suitable material. and further claims the exclusive right of applying his machine to the turning or bending the edges of sheets of Tin. Copper and iron or any other metal.

The subscriber also claims the privilege of forming metal Roofs in such a manner that they effectually resist the driving of rain. This is done by inserting a small piece of metal (which has been previously bent by his machine) over each notch in the corners of the sheets. and are locked in with them on the roof. These pieces may be secured by nails and not being exposed to water are not so liable to rust. the old practice of driving nails through the sheets is thus dispensed with entirely Exd [illegible]

Witnesses
Peter Lee
John C. Franklin

John Woolley.